United States Patent [19]

Gundlach et al.

[11] Patent Number: 4,463,363

[45] Date of Patent: Jul. 31, 1984

[54] FLUID ASSISTED ION PROJECTION PRINTING

[75] Inventors: Robert W. Gundlach, Victor; Richard F. Bergen, Ontario, both of N.Y.

[73] Assignee: Xerox Corporation, Stamford, Conn.

[21] Appl. No.: 395,170

[22] Filed: Jul. 6, 1982

[51] Int. Cl.[3] .............................................. G01D 15/06

[52] U.S. Cl. .................................................... 346/159

[58] Field of Search ................ 346/158, 159; 250/326, 250/426; 361/222, 230

[56] References Cited

U.S. PATENT DOCUMENTS 3,715,762 2/1973 Magill et al. ........................ 346/159
3,742,516 6/1973 Cavanaugh et al. ................ 346/159
3,997,113 12/1976 Pennebaker, Jr. .................. 346/159
4,117,778 10/1978 Watanabe et al. .................. 346/159

*Primary Examiner*—Thomas H. Tarcza
*Attorney, Agent, or Firm*—Serge Abend

[57] ABSTRACT

A fluid jet assisted electrographic marking apparatus for ion projection printing wherein ions are generated in a chamber, entrained in a rapidly moving fluid stream passing into, through and out of the chamber, modulated in an electroded exit zone by being selectively emitted or inhibited therein, and finally deposited in an imagewise pattern on a relatively movable charge receptor.

6 Claims, 4 Drawing Figures

FLUID ASSISTED ION PROJECTION PRINTING

This invention relates to an ion projection printing apparatus wherein ions are generated in a chamber, entrained in a rapidly moving fluid stream passing through the chamber, modulated in an electroded exit zone and finally deposited in an imagewise pattern on a relatively movable charge receptor.

It has long been desired to provide a reliable, high resolution non-contact printing system. One approach to this end is ion projection printing which, in one form, entails depositing electrostatic charges in a latent image pattern directly upon a charge receptor surface and then rendering the charge pattern visible, in some known manner. Clearly, such a system would have decided benefits in machine design, as compared to the known contact printing arrangements, as it would overcome the primary contact printing problem of friction and mechanical wear. Typically, ion projection printing comprises the generation of ions in an ion stream and the control of the ions which may reach a charge receiving surface.

In U.S. Pat. No. 3,495,269 (Mutschler et al) entitled "Electrographic Recording Method and Apparatus With Inert Gaseous Discharge Ionization And Acceleration Gaps" there is taught a pin electrode ion projection apparatus wherein ions are selectively generated, prior to being accelerated to the receptor surface by a high voltage backing electrode. In U.S. Pat. No. 3,673,598 (Simm et al) entitled "Apparatus For The Recording Of Charge Images" there is disclosed in combination, a corona wire ion generator with a modulation structure comprised of two spaced conductive apertured plates. By adjusting the potential difference between the plates ions are allowed to pass through the apertures or are inhibited from passing. Those ions allowed to pass through the modulation structure are then attracted to and accelerated by a high voltage backing electrode.

In three patents granted to IBM in 1973, yet another ion projection printing approach is taught. U.S. Pat. No. 3,715,762 (Magill et al) entitled "Method And Apparatus For Generating Electrostatic Images Using Ionized Fluid Stream", U.S. Pat. No. 3,725,951 (McCurry) entitled "Electro-Ionic Printing" and U.S. Pat. No. 3,742,516 (Cavanaugh et al) entitled "Electro-Ionic Printing Apparatus" each disclose an ion projection printing system using a controlled ionized fluid stream for discharging precharged areas on a charge receiving surface. Each incorporates the ion generation chamber described and illustrated in U.S. Pat. No. 3,715,762. It comprises an array of corona generating needles adjacent an array of apertures; one for each image dot to be produced. By either selectively, fluidically directing portions of the ionized stream upon a receptor surface ('762), passing the ionized stream through electroded channels ('951) or, passing the ionized stream through an electroded modulating slot ('516), ions may be passed to an image receptor. It should be apparent that in order to obtain high resolution printing, on the order of about 200 dots per inch, a very complex and expensive structure would be required. Consider the implications of manufacturing a corona generating head incorporating hundreds or even thousands of needles, each properly spaced from and aligned with a related orifice. A major shortcoming of the modulation structures of the '951 and '516 patents is the substantial amount of insulating material within the exit zones which will accumulate charge thereon and deleteriously affect image control.

It is an object of the present invention to provide a unique, simple, fluid flow assisted, high resolution ion projection printing apparatus from which high velocity narrow fluid "beams" of high current density may be discharged upon a charge receptor surface. It is also an object of this invention to obtain uniform ion generation and highly efficient entrainment of the ions in the flowing fluid stream and to provide low voltage modulation means for turning "on" and "off" the ion flow to the charge receptor surface.

The present invention may be carried out, in one form, by providing a fluid assisted ion projector for generating and for placing electrostatic charges in an imagewise pattern upon a relatively movable charge receptor. The ion projector comprises a source of ionizable, pressurized transport fluid, such as air, and an ion generation housing, having a highly efficient entrainment structure and a modulation structure. Within the ion generation housing there is a corona generator comprising a conductive chamber surrounding a wire, and an entrainment structure which comprises an inlet opening for connecting the source of ionizable fluid into the chamber and for directing the fluid through the corona generator, and an outlet opening for removing ion entraining fluid from the chamber. The exiting ion laden fluid is directed adjacent to the modulation structure for turning "on" and "off" the ion flow to the charge receptor surface. The chamber, the corona generating source, the inlet opening, the outlet opening and the modulation structure each extends in a direction transverse to the direction of relative movement of the charge receptor.

Other objects and further features and advantages of this invention will be apparent from the following more particular description considered together with the accompanying drawings, wherein.

Figure 1:
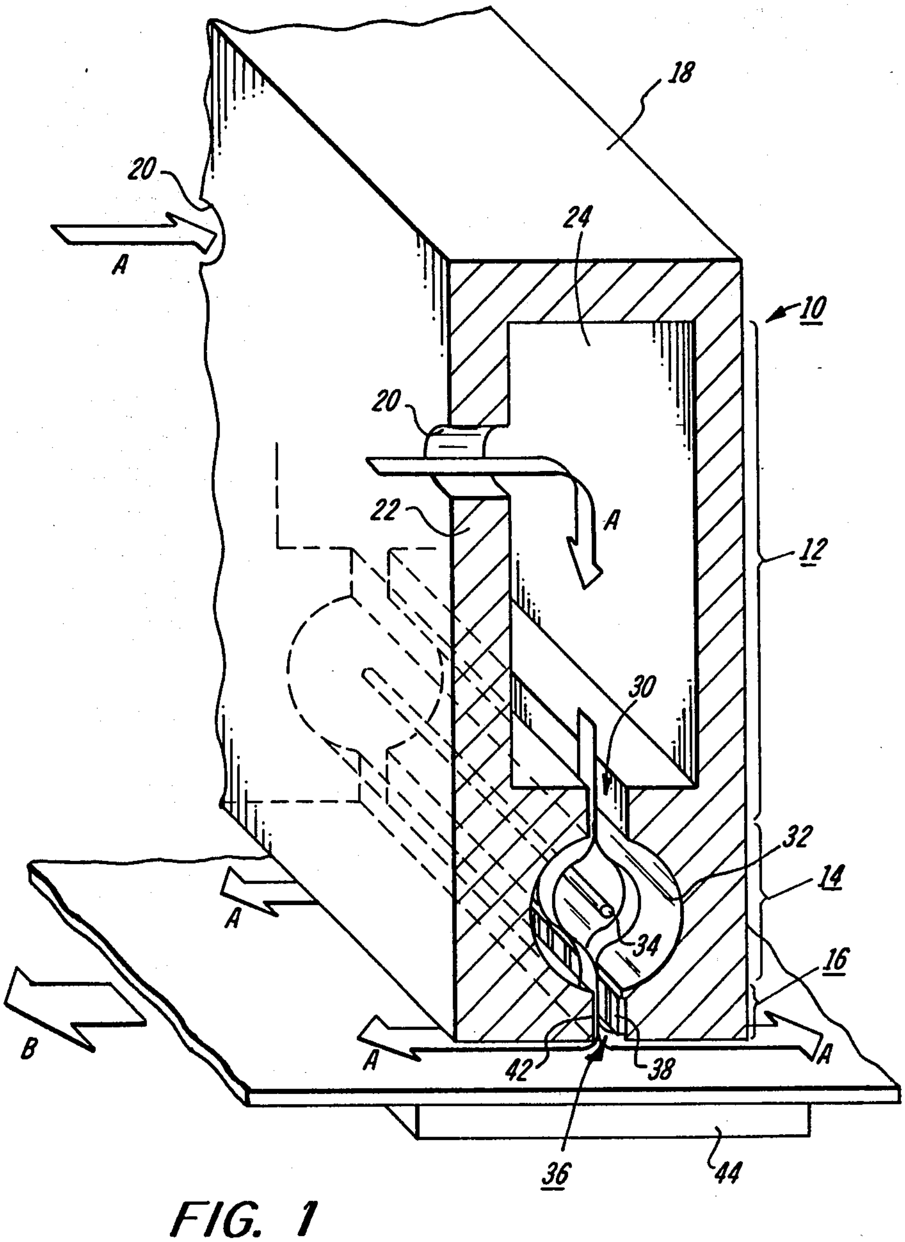
FIG. 1 is a perspective view of the fluid flow assisted ion projector, showing the air flow path through the device.

With particular reference to the drawings, there is illustrated, by way of example, an ion projector 10 comprising three operative zones; a fluid pressure distribution zone 12, an ion generation zone 14 and an ion modulation zone 16. Although these three zones are shown occupying a common housing 18 (in FIG. 1) it should be understood that as long as the zones are properly, operatively interconnected, any number of specific configurations of the present invention are possible (note the separate modulation zone in FIGS. 2–4).

Figure 2:
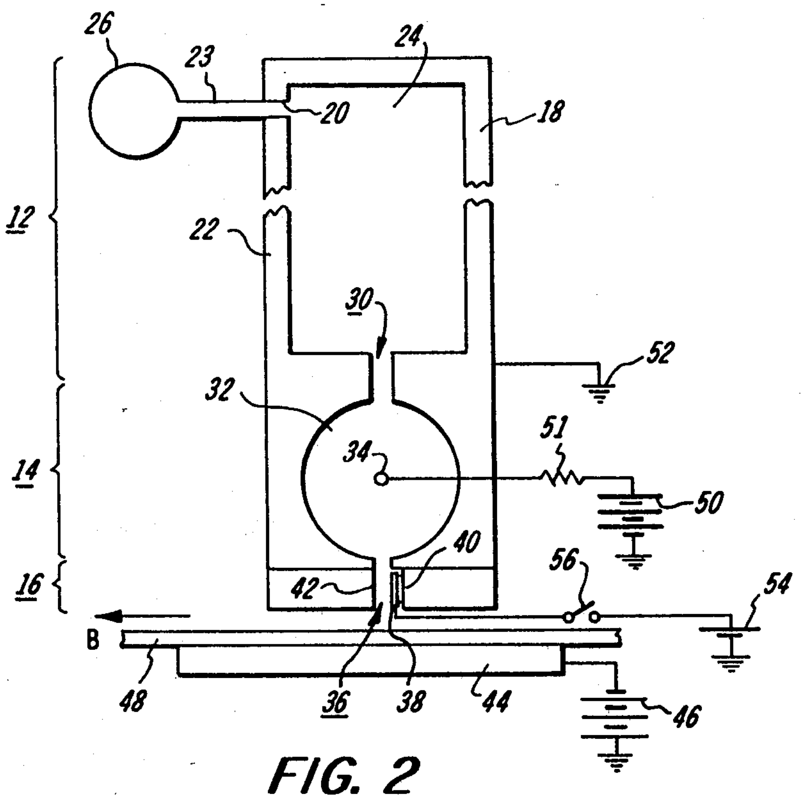
FIG. 2 is a cross-sectional elevation view through the device, showing the appropriate electrical biases.

Several openings 20 pass through a side wall 22 of housing 18 for allowing an ionizable fluid, such as air, to be passed into a plenum chamber 24. A representation of an air pump 26 and suitable ducting 28, which may be connected to the openings 20, is shown in FIG. 2. Pressurized air is allowed to escape from the plenum chamber 24 through metering inlet slit 30 into ion generation chamber 32 having electrically conductive walls, substantially surrounding corona generating wire 34, and out of the chamber 32 through exit slit 36. The entrance of the exit slit should be electrically conductive and at the same low potential on each side of the slit, in order to prevent fields from existing in this region of relatively slow moving air, which fields will sweep the ions out of the air before they can be accelerated through the slit. Furthermore, if the fields extend up into the ionization chamber 32, they affect larger portions of the charged fluid and produce severe losses in image resolution. Within the exit slit, and along one wall thereof, are a number of spaced, control, or modulation, electrodes 38 mounted upon an insulating support 40. The opposite wall or reference electrode 42 of the exit slit may or may not be provided with plural electrodes, as dictated by the control electronics, but should be electrically conductive and connected to a reference potential. A single opposing electrode is preferred, connected to ground or to a low reference potential through a low impedence connector. This insures that the reference electrode is not altered by the ion currents it receives and that the modulating fields are totally controlled by the voltages applied to the separate control electrodes. Also, for this reason, the polarity of the controlelectrode should be the same as that of the ions in the air stream.

Spaced from the ion projector 10, is a backing or accelerating electrode 44 connected to a high potential source 46. A planar charge receptor sheet 48 passes over the accelerating electrode. The direction of fluid flow through the ion projector and the direction of relative movement between the projector and the charge receptor are indicated by the arrows A and B, respectively.

As illustrated in FIG. 1, the housing 18 has been cut off at both ends, for clarity, but it should be understood that it has an aspect ratio such that its extent in the length direction (into the sheet) is substantially longer than its height and may be readily fabricated to any length, so that it may completely traverse a charge receptor sheet eleven inches wide, or even three feet wide. Since the corona generating wire 34 must span the entire length of the ion generation chamber 32 and must be in the same relationship to the chamber walls, for each increment of its length, suitable anchoring means will have to be provided between the end walls (not shown) and the wire for maintaining adequate tension, to prevent its sagging along its length. In order to ionize the air (or other ionizable fluid) around the wire for generating a uniform corona around each linear increment of the wire in the space between the wire and the housing, well known technology is applied. For example, a high potential source 50 (on the order of several thousand volts) may be applied to the wire 34 through a suitable resistance element 51 (typically one megohm) and a reference potential 52 (electrical ground) may be applied to the conductive housing 18. The ions, thus generated, will be attracted to the conductive housing where they will recombine into uncharged air molecules.

The right circular cylindrical geometry, shown for the ion generation chamber 32, is a preferred shape. However, as long as the chamber does not present the ion generator with any inwardly facing sharp corners or discontinuities, which would favor arcing, the shape may assume other cross-sections. The preferred shape enables a uniform, high space charge density, ion cloud within the chamber since the high potential corona wire "sees" a uniform and equidistant surrounding reference potential on the walls of the cavity. As to the inlet and exit slits, 30 and 36, these extend parallel to the axial direction of the chamber and yield a uniform air flow over the corona generating wire 34 and out of the housing 18. Preferably, the slits are diametrically opposite to one another; however, it is possible to introduce air to or remove air from the chamber in other directions, or even to provide plural inlet slits.

As illustrated, the corona generating wire 34 is located along the axis of the cylindrical chamber 32. It has been found that if the wire is moved off axis and is placed closer to the outlet slit there is an increase in ion output from the ion projector 10, because the space charge density in the region between the wire and the exit slit increases dramatically. It should be borne in mind that while increased ion output may be achieved, the sensitivity to arcing is increased with the reduced spacing. Also, wire sag and wire vibrations will become more critical with the reduced spacing. In any event, as set forth above, the wire should be parallel to the axis in order to provide output uniformly along the entire length of the ion projector.

In order for an ion projection apparatus to be practical, it is necessary to obtain an adequate space charge density in the output airflow. However, within the exit slit, similarly charged ions will repel one another and will be driven to the electrically grounded slit walls into which their opposite charges have been induced, causing some of the air ions to recombine into uncharged air molecules. A desired increase in the ion exit rate (i.e. plate current or writing current) will be facilitated by an increase in the air flow itself, in a multi-fold manner. First, the fluid pressure head within the chamber 32, increases the electrical potential at which arcing will occur between the corona wire 34 and the conductive housing 18, thereby stabilizing the corona and yielding an increased space charge density within the chamber. Second, since the airflow entrains ions and sweeps them into and through the exit slit, the number of entrained ions swept into the exit airstream is proportional to the airflow rate. Third, a higher space charge is possible if the time each ion spends in the slit is made shorter (i.e. by increasing the rate of airflow, the ions have less time to neutralize), resulting in an increase in the output writing current with the air velocity for any given space charge.

Once the ions have been swept into the exit slit with the rapid airflow, it becomes necessary to render the escaping ion-laden airstream intelligible. This is accomplished in the modulation zone 16 by the schematically illustrated (FIGS. 3 and 4) individually switchable modulation electrodes 38, each connected to a low voltage source 54 (on the order of five to ten volts) through a switch 56. In actual construction, the modulation electronics driving the control electrodes 38 may comprise standard multiplex circuitry whereby groups of electrodes are ganged and suitable backing electrodes are present on the opposite wall 42 or, alternatively each electrode may be individually driven by a known, series in/parallel out, shift register. Each electrode controls a narrow "beam" of ions in the curtain-like air stream. For example, in an array of 200 control electrodes per inch, the conductive electrodes could be about three and one-half ($3\frac{1}{2}$) mils wide each separated from the next by one and one-half ($1\frac{1}{2}$) mils. It is expected that more compact arrays, having narrower electrodes and narrower insulating barriers, is well within the realm of the possible.

Within the modulation zone, an electric field can be selectively established (i.e. switch 56 closed) between a given control electrode 38 and the opposite wall 42 of the exit slit 36. The field will extend in a direction transverse to the direction of airflow. Applying a voltage of the same polarity as the ionic species, as illustrated, imposes an electric field upon the ions in a selected "beam", repelling the ions from the control electrode and driving them into contact with the opposite electrically grounded conductive wall where they recombine into uncharged, or neutral, air molecules. Thus, the discharge from the ion projector, in that region, will carry no printing ions. This action is represented by the arrows C in FIG. 4. Conversely, when the modulation electric field is not applied (i.e. switch 56 open), the high velocity air flow assisted ion "beam" passes through the exit slit 36, unimpeded, as represented by the arrows D in FIG. 3. A developable line of information may be formed by controlling the individual modulation electrodes 38, thereby emitting or inhibiting selected ion "beams", as desired.

Figure 3:
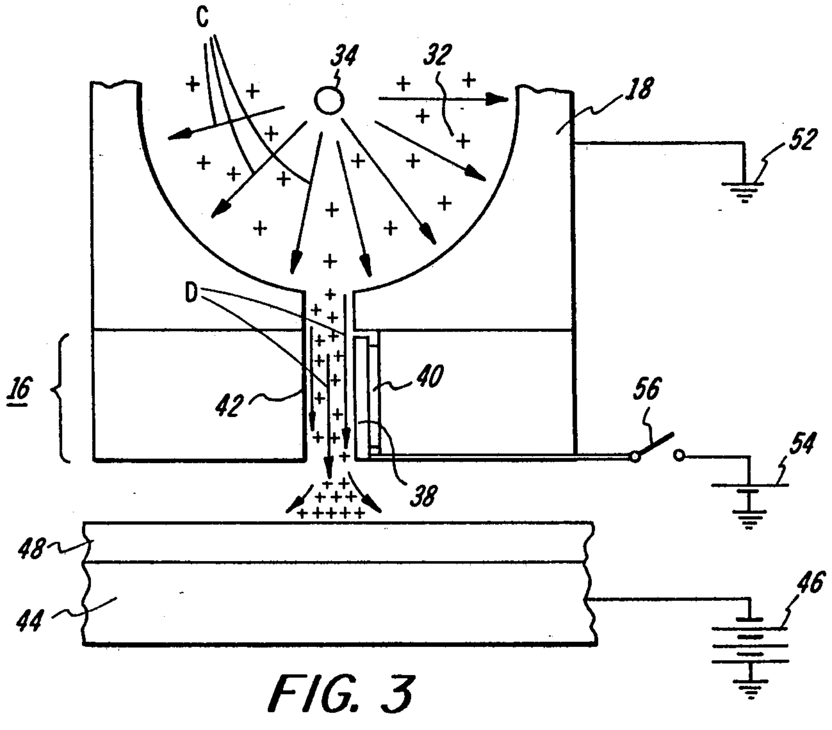
FIG. 3 is an enlarged partial elevation view, showing the ion flow path when a modulation electrode allows "writing" to occur.
Figure 4:
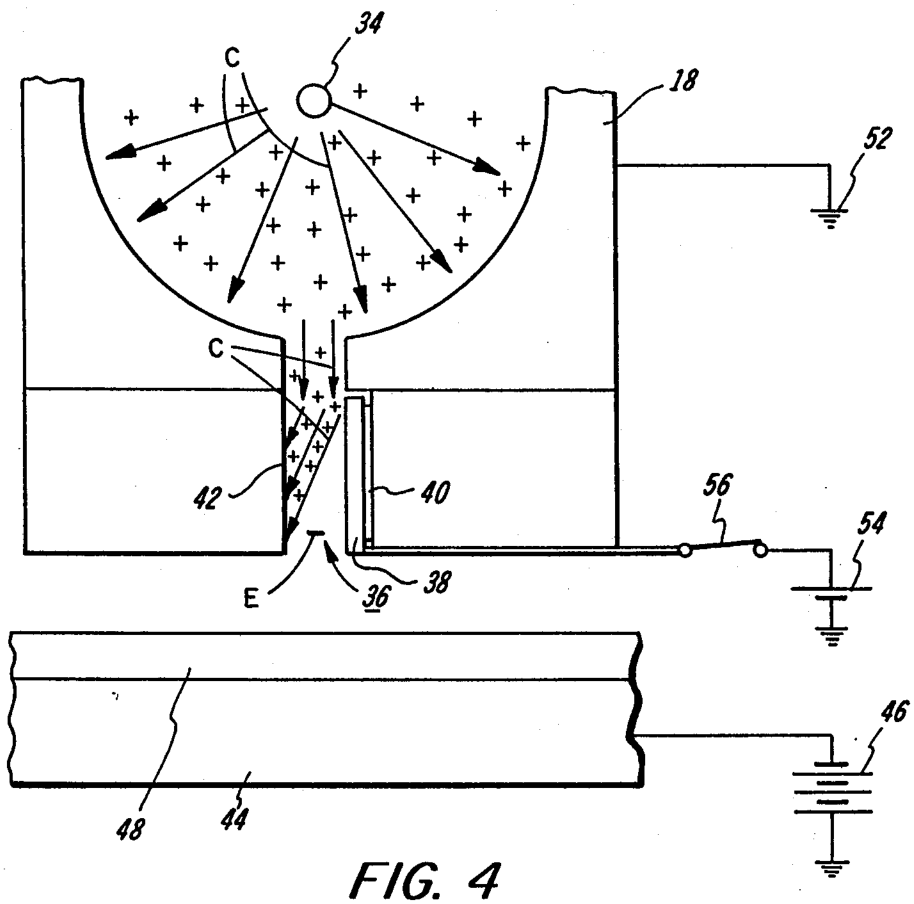
FIG. 4 is an enlarged partial elevation view, similar to FIG. 3, showing the ion flow path when the modulation electrode inhibits "writing".

Only as the ions are about to emerge from the modulation zone 16, will they will come under the influence of the high voltage accelerating electrode 44. In FIG. 4, the concave dotted line E, extending into the exit slit 36, at its discharge end, represents the extent of the projection field into the slot. By maintaining a large electric field (of about 50 volts per mil spacing) of opposite polarity to the ionic species, between the electrode 44 and the housing 18, the ions will be rapidly accelerated out of the exit slit as soon as they enter its influence. It is important to keep the potential upon the electrode 44 as high as possible, but just below arcing, so as to attract the ions as directly as possible to the receiving surface in order to obtain high resolution. If the electrode potential were substantially lower than its possible limit, resolution would be impaired by flaring, in the following manner: Accelerated ions, normally deposited on the charge receptor surface in a gaussian distribution (see FIG. 4) will see the vector sum of all electric fields acting thereon, namely, the accelerating field and the built-up space charge of already deposited ions. As a result, a vector in opposition to the flow of ions will attempt to cause the continuing flow of ions to be shunted to the side, as shown in FIG. 3, resulting in a larger diameter spot size (flaring). The higher the accelerating voltage, the less the effect of the already deposited ions, and the more compact the spot size.

It has been found that air flow assisted ion projection, carried out in accordance with the present invention, is capable of achieving at least an order of magnitude improvement in output current density over non-assisted ion projection systems. As discussed above, drawing ions from a stationary plasma and accelerating them by a suitable collecting field is well known. The two slit approach comprehended by the present invention offers decided advantages, enabling a practical working device. First, the pressurized air will have the beneficial effect of increasing the potential at which arcing occurs, thus enabling a higher ion charge density within the chamber. Second, uniform "curtain" of input air entrains a great number of ions and uniformly drives them out of the exit slit. Third, the moving air allows the exit slit to be longer (in the direction of air flow) than non-flow devices, which in turn enables low voltage (e.g. 5 to 10 volts) modulation of the ion beam. Fourth, the air flow sweeps the ions through the exit slit at a high velocity, enabling a rapid writing rate. Fifth, the high velocity will also increase ion output current by inhibiting space charge spreading of the projected "beam" within the exit slit. Sixth, contaminant compounds, generated by all electrical discharges in air, will be driven out of the device, eliminating harmful deposits.

It should be understood that the present disclosure has been made only by way of example and that numerous changes in details of construction and the combination and arrangement of parts may be resorted to without departing from the true spirit and the scope of the invention as hereinafter claimed.

What is claimed is:

1. A fluid jet assisted electrographic marking apparatus for placing electrostatic charges upon a charge receptor in an image-wise pattern, said apparatus being characterized by including transport fluid supply means, ion generation means comprising an electrically conductive chamber, connected to a reference potential, and an elongated corona wire positioned in said chamber and connected to a high potential source, said chamber and said corona wire extending in a direction transverse to the direction of transport fluid flow, ion entrainment means comprising inlet means for delivering transport fluid into said chamber and outlet means for directing transport fluid out of said chamber, said inlet means and said outlet means each extending in said transverse direction and each comprising a slit-like metering orifice for raising the velocity of the transport fluid passing therethrough, such that the velocity transport fluid passing through said inlet means and into said chamber sweeps ions into said outlet means and the high velocity transport fluid passing through said outlet means inhibits charge spreading in said outlet means, and modulation means comprising a plurality of spaced, individually controllable, electrodes located adjacent the path of the exiting ion entraining transport fluid, each electrode selectively connectible to a low potential source for neutralizing the ions in selected portions of the exiting entraining fluid, whereby the ions allowed to pass to the charge receptor represent a desired charge pattern.

2. The fluid jet assisted electrographic marking apparatus as defined in claim 1 characterized in that said transport fluid supply means comprises a compression pump and a collection chamber connected together by duct means and said inlet means is disposed between said collection chamber and said electrically conductive chamber.

3. The fluid jet assisted electrographic marking apparatus as defined in either claim 1 or 2 characterized in that said inlet means is positioned to direct the transport fluid over said wire.

4. The fluid jet assisted electrographic marking apparatus as defined in claim 3 characterized in that said electrically conductive chamber is cylindrical in cross-section and said inlet means and said outlet means are in alignment and are diametrically opposite one another.

5. The fluid jet assisted electrographic marking apparatus as defined in claim 1 characterized in that said control electrodes are located within said outlet means, are elongated, and extend in the direction of fluid flow.

6. The fluid jet assisted electrographic marking apparatus as defined in claim 1 characterized by further including a backing electrode for supporting the charge receptor, said backing electrode being connected to a high potential source for attracting ions entrained in the exiting fluid jet toward the charge receptor.

* * * * *